July 11, 1933.  H. W. JONKHOFF  1,918,108
TUBULAR SHAFT COUPLING
Filed Dec. 28, 1931
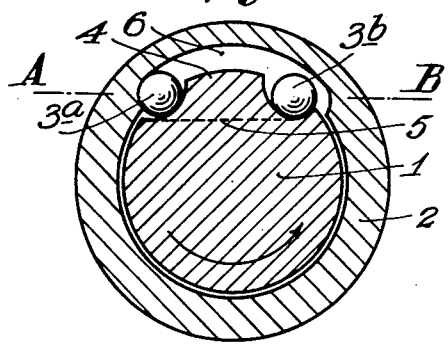
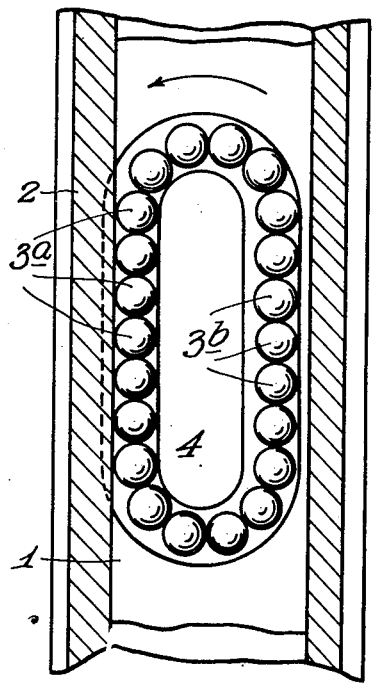
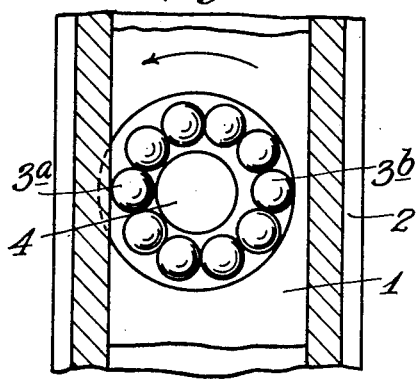
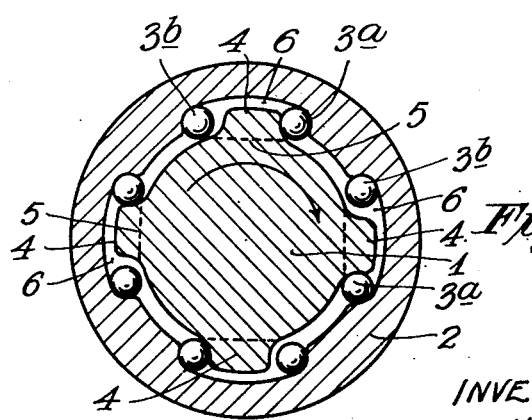
INVENTOR
HENRI W. JONKHOFF Patented July 11, 1933

1,918,108

UNITED STATES PATENT OFFICE

HENRI WOUTER JONKHOFF, OF DUSSELDORF, GERMANY

TUBULAR SHAFT COUPLING

Application filed December 28, 1931, Serial No. 583,557, and in Germany January 2, 1931.

There are several methods by which an inner tube or shaft is caused to drive an outer tube, while one of the two members makes longitudinal movements relatively to the other. In such cases a sliding device has been introduced to take up the relative movement.

Such sliding devices have been far from satisfactory mostly on account of the fact that during the sliding the torque or rotational drive is still to be transmitted so that the contacting surfaces of the sliding device are subjected to great pressure for which no sufficient amount of bearing surface can be provided, and relative longitudinal movement is difficult.

The invention now provides for a rolling instead of a sliding movement and such has been arrived at by introducing rolling balls, which not only take up the torque but at the same time provide for the relative movement between the two members.

The accompanying drawing illustrates the invention with examples and in said drawing:—

Figure 1 is a transverse section;

Figure 2 is a sectional plan on the line A—B of Figure 1;

Figure 3 is a view similar to Figure 2 of a variation;

Figure 4 is a view similar to Figure 1 of a further modification.

A shaft (1) drives a tube (2) and the balls (3a and 3b) form the intermediary contact between the two.

In Figure 4 of the drawing, a through section of the system is shown and this illustrates that the form of the inner shaft is nearly square, for there are four corners (4) which can move sidewardly in a limited way between the balls kept together in the grooves (6) which are provided inside the outer shaft body. In Figure 1, only one corner (4) is employed.

The shapes of the outer shaft and the inner tube are such that the balls lie free between them, but as soon as torque is exerted by the inner shaft, the balls (3a) are pushed by the corners (4) of the inner shaft, against the walls of the grooves (6) so that they have to transmit the torque from the inner shaft to the outer tube whilst meanwhile the balls (3b) are allowed more room.

As soon as, during the transmission of torque, the members (1) and (2) start to move longitudinally relatively to each other, the balls (3a) are pushed in their race consequently must roll forward whilst the balls (3b) which lie free, are pushed by the balls (3a) to roll in the opposite direction through the ball-race, which in Figure 3 is an oval circuit provided in the surface of the inner shaft at a certain depth, and in Figure 2, a circular circuit.

It will be clear that the system works equally as well when the torque is exerted by the outer tube instead of by the inner.

The cross part of the ball race in the cross sectional views is shown by a dotted line indicating that the bottom of the race is kept at the same plane so that the balls have the most room at the spot indicated by (5).

The exact shape of the members (1) and (2) may be changed so as to secure a better guiding when assembled.

I claim:—

1. In combination, a pair of rotary elements one extending through the other and relatively slidable axially, one of said elements having an endless raceway opening at all points through the surface of said member which faces the other member, balls disposed in said raceway, the other element having a pair of shoulders one cooperating with the balls in one side portion of said raceway and the other cooperating with the balls in the other side portion of the raceway whereby rotation of either element in either direction imparts corresponding rotation to the other element, the relative circumferential spacing of the side portions of the raceway and said shoulders being such that when either element is rotated the balls in one side portion of the raceway operate to transmit the rotary motion to the other element and the balls in the other side portion of the raceway are permitted to travel freely through said portion.

2. In combination, a pair of rotary elements one extending through the other and relatively slidable axially, one of said elements having an endless raceway opening at all points through the surface of said member which faces the other member, balls disposed in said raceway, the other element having a pair of shoulders one cooperating with the balls in one side portion of said raceway and the other cooperating with the balls in the other side portion of the raceway whereby rotation of either element in either direction imparts corresponding rotation to the other element, and means whereby the torque always is transmitted through the balls in only one side portion of the raceway and the balls in the other side portion are permitted to travel freely through the latter side portion while the balls in the first mentioned side portions are transmitting the torque.

In witness whereof I have signed this specification.

HENRI WOUTER JONKHOFF.